(12) United States Patent
Kwak et al.

(10) Patent No.: US 9,263,761 B2
(45) Date of Patent: Feb. 16, 2016

(54) ELECTRODE ASSEMBLY AND RECHARGEABLE BATTERY HAVING THE SAME

(71) Applicant: SAMSUNG SDI CO., LTD., Yongin-si, Gyeonggi-do (KR)

(72) Inventors: Yoon-Tai Kwak, Yongin-si (KR); Jeong-Won Oh, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 114 days.

(21) Appl. No.: 13/926,032

(22) Filed: Jun. 25, 2013

(65) Prior Publication Data

US 2014/0147714 A1 May 29, 2014

(30) Foreign Application Priority Data

Nov. 23, 2012 (KR) .................... 10-2012-0133993

(51) Int. Cl.

| | |
|---|---|
| *H01M 4/00* | (2006.01) |
| *H01M 10/04* | (2006.01) |
| *H01M 4/13* | (2010.01) |
| *H01M 4/64* | (2006.01) |
| *H01M 10/0587* | (2010.01) |
| *H01M 10/0525* | (2010.01) |
| *H01M 4/02* | (2006.01) |

(52) U.S. Cl.
CPC ............ *H01M 10/0431* (2013.01); *H01M 4/13* (2013.01); *H01M 4/64* (2013.01); *H01M 10/0587* (2013.01); *H01M 10/0525* (2013.01);

(Continued)

(58) Field of Classification Search
CPC ................ H01M 10/0431; H01M 10/0525; H01M 10/0587; H01M 2004/021; H01M 4/13; H01M 4/64; Y02E 60/122; Y02T 10/7011
USPC ................. 429/94, 133, 164, 211
See application file for complete search history.

(56) References Cited

U.S. PATENT DOCUMENTS

| 2006/0008701 A1 | 1/2006 | Kim et al. |
| 2006/0051662 A1 | 3/2006 | Kwak et al. |
| 2011/0183170 A1* | 7/2011 | Kwak .............................. 429/94 |

FOREIGN PATENT DOCUMENTS

| CN | 202434660 U | 9/2012 |
| EP | 2228852 A1 | 3/2010 |

(Continued)

OTHER PUBLICATIONS

Extended European Search Report dated Feb. 13, 2014.

(Continued)

*Primary Examiner* — Patrick Ryan
*Assistant Examiner* — Ben Lewis
(74) *Attorney, Agent, or Firm* — Lee & Morse, P.C.

(57) ABSTRACT

An electrode assembly includes a positive electrode including a positive active material layer on each of first and second surfaces of a positive electrode current collector, a negative electrode including a negative active material layer on each of first and second surfaces of a negative electrode current collector, and an inner separator between the positive electrode and the negative electrode, wherein each of the positive electrode and the negative electrode includes a side end uncoated region at respective side ends of the positive electrode and the negative electrode, the side end uncoated regions of each of the positive and negative electrodes including no active material layers on respective electrode current collectors, and wherein at least one of the positive electrode and the negative electrode has an inner uncoated region positioned at a center of the electrode assembly, the inner uncoated region including no active material layer thereon.

16 Claims, 10 Drawing Sheets

(52) U.S. Cl.
 CPC ........ *H01M 2004/021* (2013.01); *Y02E 60/122* (2013.01); *Y02T 10/7011* (2013.01)

(56) References Cited

FOREIGN PATENT DOCUMENTS

| EP | 2348562 A1 | 1/2011 |
|---|---|---|
| JP | 05-314984 A | 11/1993 |
| KR | 10-2005-0113860 A | 12/2005 |
| KR | 10-2011-0087559 A | 8/2011 |
| WO | WO 2009/011517 A1 | 1/2009 |

OTHER PUBLICATIONS

European Office Action dated Nov. 3, 2015 in Corresponding European Patent Application No. 13181665.4.

* cited by examiner

ELECTRODE ASSEMBLY AND RECHARGEABLE BATTERY HAVING THE SAME

CROSS-REFERENCE TO RELATED APPLICATION

Korean Patent Application No. 10-2012-0133993 filed on Nov. 23, 2012, in the Korean Intellectual Property Office, and entitled: "ELECTRODE ASSEMBLY, AND RECHARGEABLE BATTERY HAVING THEREOF," is incorporated by reference herein in its entirety.

BACKGROUND

1. Field

The described technology relates generally to an electrode assembly and a rechargeable battery, and more particularly, the described technology relates generally to an electrode assembly with an improved structure of an uncoated region, and a rechargeable battery.

2. Description of the Related Art

Rechargeable batteries are batteries that can be repeatedly charged and discharged, e.g., as opposed to primary batteries that are incapable of being recharged. Small-capacitance rechargeable batteries may be used for small portable electronic devices, e.g., a mobile phone, a laptop computer, and a camcorder, and large-capacitance batteries may be used to supply power, e.g., for driving a motor in hybrid vehicles.

Recently, a high power rechargeable battery using a non-aqueous electrolyte with high energy density has been developed. The high power rechargeable battery is configured as a large-capacitance battery module by connecting a plurality of rechargeable batteries in series to be used for driving a motor in a machine requiring large power, e.g., an electric vehicle. Further, the rechargeable battery may be formed in a cylindrical shape, a polygonal shape, or a pouch shape.

In the rechargeable battery, the positive electrode includes a positive electrode current collector and a positive active material layer disposed on both sides of the positive electrode current collector, and the negative electrode includes a negative electrode current collector and a negative active material layer disposed on both sides of the negative electrode. The positive electrode and the negative electrode are wound with a separator therebetween to define an electrode assembly.

The above information disclosed in this Background section is only for enhancement of understanding of the background of the described technology and therefore it may contain information that does not form the prior art that is already known in this country to a person of ordinary skill in the art.

SUMMARY

The described technology has been made in an effort to provide a rechargeable battery having advantages of high energy density.

An exemplary embodiment provides an electrode assembly including a positive electrode including a positive active material layer on each of first and second surfaces of a positive electrode current collector, a negative electrode including a negative active material layer on each of first and second surfaces of a negative electrode current collector, and an inner separator between the positive electrode and the negative electrode, wherein each of the positive electrode and the negative electrode includes a side end uncoated region at respective side ends of the positive electrode and the negative electrode, the side end uncoated regions of each of the positive and negative electrodes including no active material layers on respective electrode current collectors, and wherein at least one of the positive electrode and the negative electrode has an inner uncoated region positioned at a center of the electrode assembly, the inner uncoated region including no active material layer thereon.

The inner uncoated region may be folded to face each other, and an active material layer may be formed on the side of the current collector opposite the inner uncoated region, in contact with the separator.

The electrode assembly may be spirally wound with the separator between the positive electrode and the negative electrode, and the inner uncoated region and the side end uncoated region of any one of the positive electrode and the negative electrode may be connected with each other.

Any one of the positive electrode and the negative electrode may have an outer uncoated region without an active material layer formed, on one side of the current collector, and the outer uncoated region may be positioned at the outermost side of the electrode assembly.

An active material layer may be formed on the side of the current collector opposite the outer uncoated region, in contact with the separator, and the outer uncoated region may be connected with the side end uncoated region.

The inner uncoated region may be formed at the negative electrode and the inner uncoated region is formed at the positive electrode.

Another exemplary embodiment provides a rechargeable battery including: an electrode assembly that performs charging and discharging; a case accommodating the electrode assembly; and a terminal electrically connected with the electrode assembly and protruding outside the case, wherein the electrode assembly includes: a positive electrode current collector and a positive electrode including a positive active material layer disposed on both sides of the positive electrode current collector; a negative electrode current collector and a negative electrode including a negative active material layer disposed on both sides of the negative electrode current collector; and an inner separator disposed between the positive electrode and the negative electrode, and the positive electrode and the negative electrode include a side end uncoated region formed at side ends of the positive electrode and the negative electrode, without an active material layer formed on both sides of the current collectors, and any one of the positive electrode and the negative electrode has an inner uncoated region positioned at the center of the electrode assembly, without an active material layer formed.

The inner uncoated region may be folded to face each other, and an active material layer may be formed on the side of the current collector opposite the inner uncoated region, in contact with the separator.

The electrode assembly may be spirally wound with the separator between the positive electrode and the negative electrode, and the inner uncoated region and the side end uncoated region of any one of the positive electrode and the negative electrode may be connected with each other.

Any one of the positive electrode and the negative electrode may have an outer uncoated region without an active material layer formed, on one side of the current collector, and the outer uncoated region may be positioned at the outermost side of the electrode assembly.

An active material layer may be formed on the side of the current collector opposite the outer uncoated region, in contact with the separator, and the outer uncoated region may be connected with the side end uncoated region.

The inner uncoated region may be formed at the negative electrode and the inner uncoated region is formed at the positive electrode.

BRIEF DESCRIPTION OF THE DRAWINGS

Features will become apparent to those of ordinary skill in the art by describing in detail exemplary embodiments with reference to the attached drawings in which.

DETAILED DESCRIPTION

Figure 1:
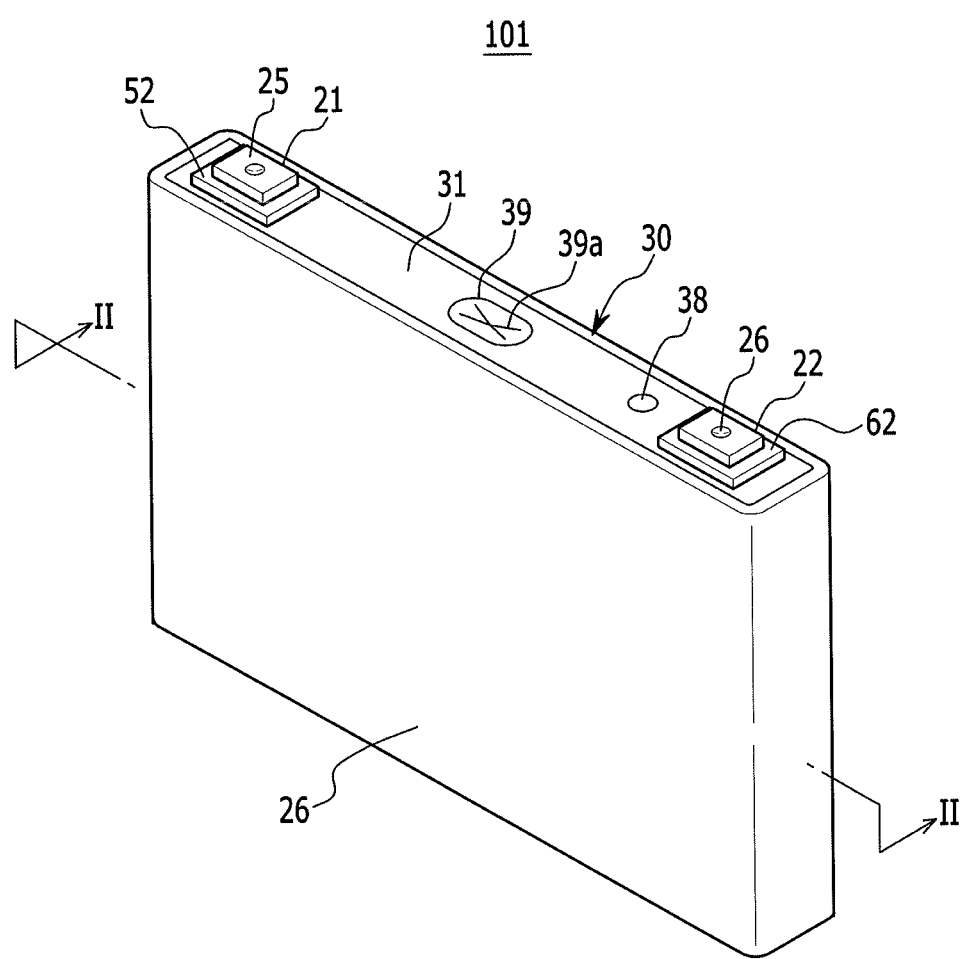
FIG. 1 illustrates a perspective view of a rechargeable battery according to a first exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

Figure 2:
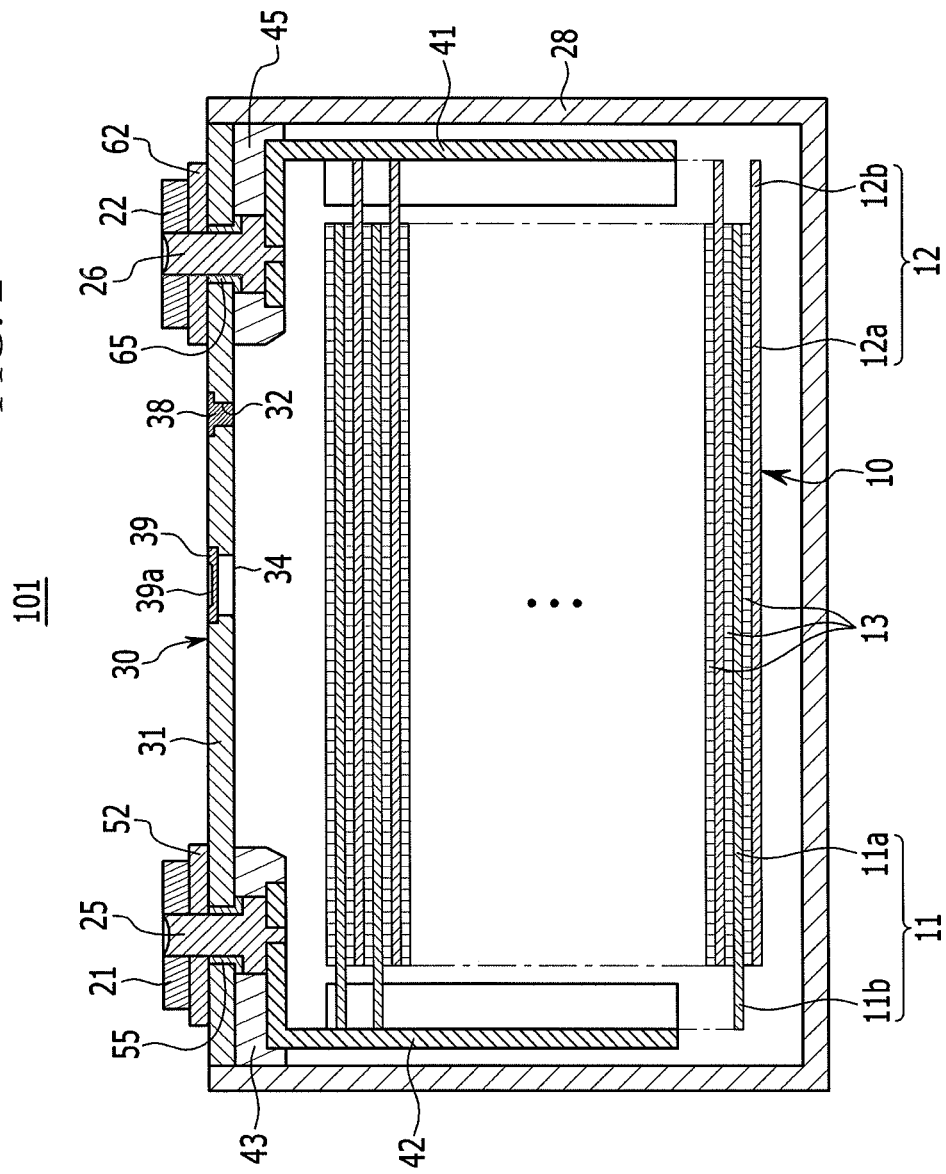
FIG. 2 illustrates a cross-sectional view taken along line II-II in FIG. 1.

FIG. 1 is a perspective view of a rechargeable battery according to a first exemplary embodiment. FIG. 2 is a cross-sectional view taken along line II-II in FIG. 1.

Referring to FIGS. 1 and 2, a rechargeable battery 101 according to the first exemplary embodiment may include an electrode assembly 10 wound with a separator 13 between a positive electrode 11 and a negative electrode 12, a case 28 in which the electrode assembly 10 is disposed, and a cap assembly 30 coupled to the opening of the case 28.

The rechargeable battery 101 according to the first exemplary embodiment is exemplified as a rectangular lithium ion rechargeable battery. However, the example embodiments are not limited thereto and may be applied to various shapes of batteries, e.g., a lithium polymer battery or a cylindrical battery.

The case 28 may have a substantially cuboid body, and an opening is formed at one side of the cuboid body. The case 28 may be made of metal, e.g., aluminum and/or stainless steel.

The cap assembly 30 may include a cap plate 31 covering the opening of the case 28, a positive terminal 21 protruding outward from, e.g., above, the cap plate 31 and electrically connected with the positive electrode 11, and a negative terminal 22 protruding outward from, e.g., above, the cap plate 31 and electrically connected with the negative electrode 12.

The cap plate 31 may be a rectangular plate that is long in one direction, and may be coupled to the opening of the case 28. The cap plate 31 may be made of metal, e.g., aluminum. A sealing cap 38 disposed in an electrolyte injection opening 32 and a vent member 39 disposed in a vent hole 34 and having a notch 39a to be opened at a predetermined pressure, are disposed in the cap plate 31.

The positive terminal 21 is electrically connected with the positive electrode 11 through a current collecting tap 42, and the negative terminal 22 is electrically connected with the negative electrode 12 through a current collecting tap 41.

A terminal connecting member 25 electrically connecting the positive terminal 21 with the current collecting tap 42 may be disposed between the positive terminal 21 and the current collecting tap 41. The terminal connecting member 25 may be inserted in a hole formed in the positive terminal 21, so an the upper end of the terminal connecting member 25 may be fixed to the positive terminal 21 by welding and a lower end of the terminal connecting member 25 may be fixed to the current collecting tap 42 by welding.

A gasket 55 for sealing may be inserted in a hole through which the terminal connecting member 25 passes, between the terminal connecting member 25 and the cap plate 31, and a lower insulating member 43, in which the lower portion of the terminal connecting member 25 is inserted, may be disposed under the cap plate 31. An upper insulating member 52 electrically insulating the positive terminal 21 from the cap plate 31 is disposed under the positive terminal 21. The terminal connecting member 25 may be fitted in the upper insulating member 52.

A terminal connecting member 26 electrically connecting the negative terminal 22 with the current collecting tap 41 may be disposed between the negative terminal 22 and the current collecting tap 41. The terminal connecting member 26 may be inserted in a hole formed in the negative terminal 22, with the upper end fixed to the negative terminal 22 by welding and the lower end fixed to the current collecting tap 41 by welding.

A gasket 65 for sealing may be inserted in a hole in which the terminal connecting member 26 is inserted, between the negative terminal 22 and the cap plate 31, and a lower insulating member 45, insulating the negative terminal 22 and the current collecting tab 41 from the cap plate 31, may be disposed under the cap plate 31. An upper insulating member 62 electrically insulating the negative terminal 22 from the cap plate 31 may be disposed under the negative terminal 22. The terminal connecting member 26 may be fitted in the upper insulating member 62.

Figure 3:
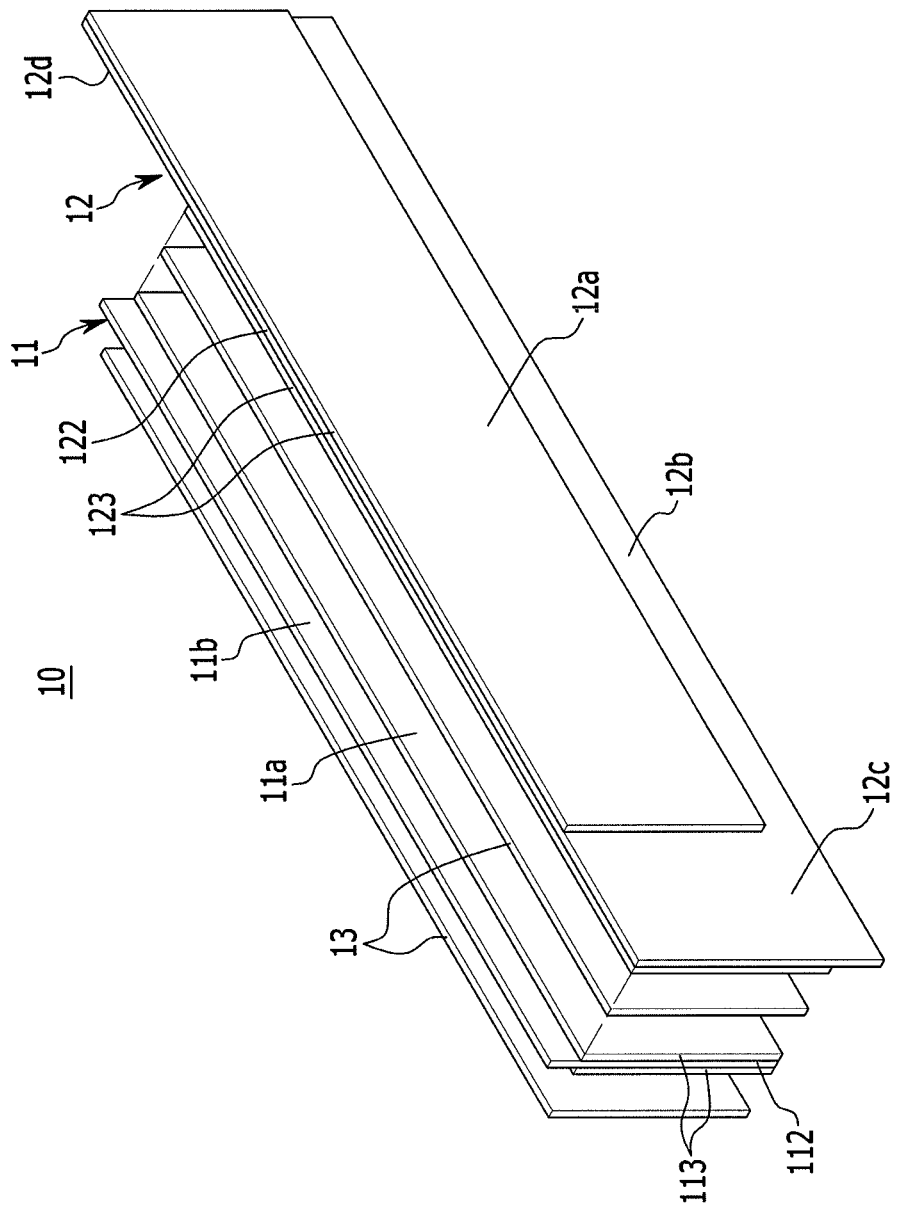
FIG. 3 illustrates an exploded perspective view showing an electrode assembly according to the first exemplary embodiment.
Figure 4:
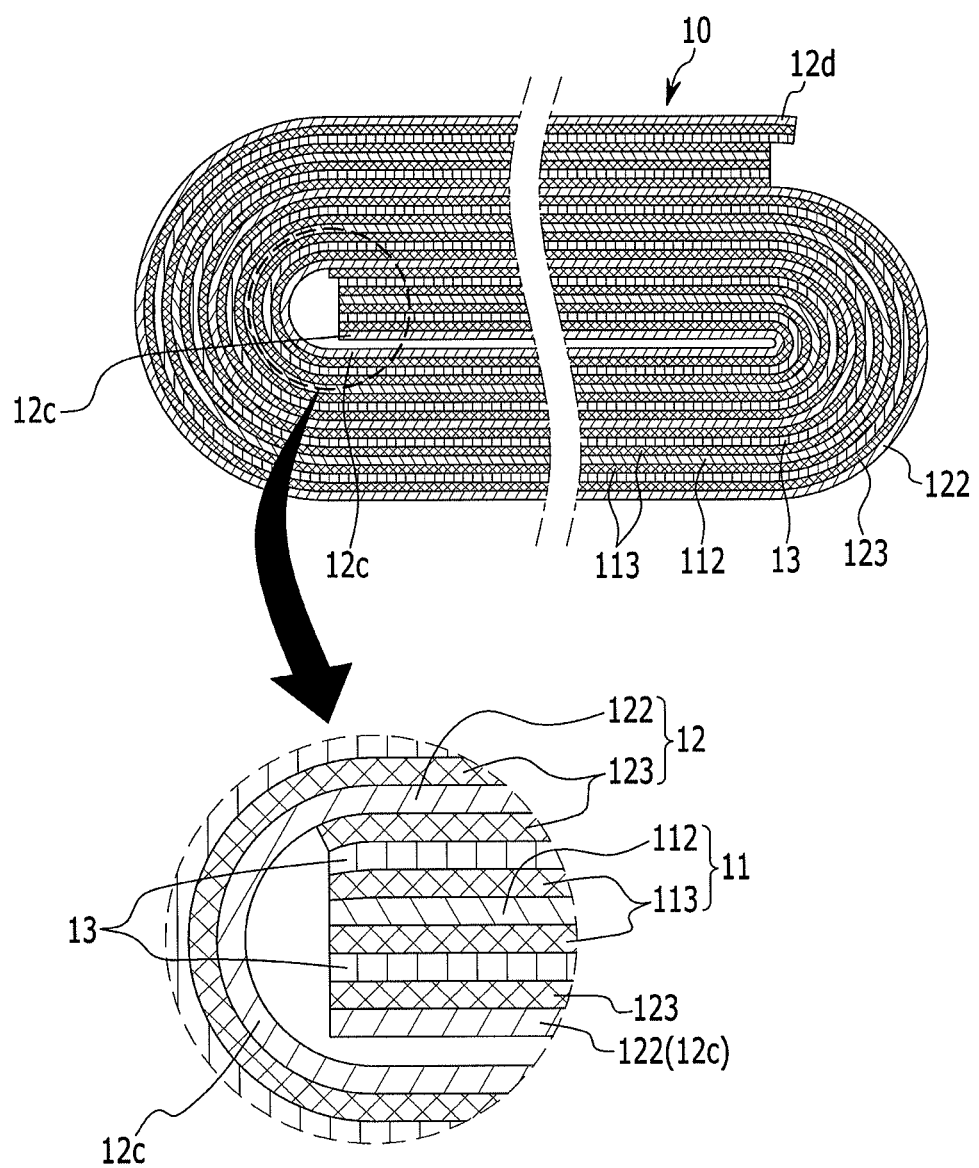
FIG. 4 illustrates a cross-sectional view of the electrode assembly in FIG. 3 in a coupled and wound state.

FIG. 3 is an exploded perspective view of the electrode assembly 10 according to the first exemplary embodiment. FIG. 4 is a cross-sectional view of the electrode assembly 10 shown in FIG. 3 in a coupled and wound state.

Referring to FIGS. 3 and 4, the positive electrode 11 is structured by forming a positive active material layer 113 on both sides of a positive electrode current collector 112 formed of a thin plate metal foil. For example, the positive electrode current collector 112 may have a flat shape extending along a first direction, so a positive active material layer 113 may be formed on longitudinal opposite surfaces of the positive electrode current collector 112, as illustrated in FIG. 3.

For example, the positive electrode current collector 112 may be formed in a stripe shape, e.g., may be long in one direction, and may be made of a metal, e.g., aluminum and/or stainless steel. The positive active layer material 113 may be made of, e.g., $LiCoO_2$, $LiMnO_2$, $LiFePO_4$, $LiNiO_2$, and $LiMn_2O_4$, a conductive agent, and a binder. The positive active material layer 113 may be coated or attached by laminating on the positive electrode current collector 112.

Further, the positive electrode 11 includes a positive electrode coating portion 11a that is a region coated with the positive active material layer 113, and a positive electrode side end uncoated region 11b that is a region without the positive active material layer 113 coated. The positive electrode side end uncoated region 11b is on a portion of each of the longitudinal opposite surfaces of the positive electrode current collector 112, so portions of both sides of the positive electrode current collector 112 are exposed at the positive electrode side end uncoated region 11b. The positive electrode side end uncoated region 11b is formed to continue along one side end of the positive electrode 11 in the longitudinal direction of the positive electrode 11.

The negative electrode 12 is structured by forming a negative active material layer 123 on both sides of the negative electrode current collector 122 formed of a thin plate metal foil. The negative electrode current collector 122 is formed in a stripe shape that is long in one direction and made of a metal, e.g., copper and/or stainless steel. The negative active material layer 123 is made of, e.g., $Li_4Ti_5O_{12}$ or a carbon-based active material, a conductive agent, and a binder. The negative active material layer 123 may be coated or attached by laminating on the negative electrode current collector 122.

The separator 13 may be made of a porous material. The separator 13 insulates the positive electrode 11 from the negative electrode 12, and provides a passage through which ions move.

The negative electrode 12 includes a negative electrode coating portion 12a that is a region coated with a negative active material layer 123, and a negative electrode side end uncoated region 12b that is a region without the negative active material layer 123 coated. The negative electrode side end uncoated region 12b is on a portion of each of the longitudinal opposite surfaces of the negative electrode current collector 122, so portions of both sides of the negative electrode current collector 122 are exposed at the negative electrode side end uncoated region 12b. The negative electrode side end uncoated region 12b is formed to continue along one side end of the negative electrode 12 in the longitudinal direction of the negative electrode 12.

The negative electrode 12 further includes a negative electrode inner uncoated region 12c formed at the front end of the negative electrode 12 and a negative electrode outer uncoated region 12d formed at the rear end of the negative electrode 12. The negative electrode inner uncoated region 12c is positioned at the innermost side of the electrode assembly 10 and the negative electrode outer uncoated region 12d is positioned at the outermost side of the electrode assembly 10.

As illustrated in FIG. 3, the negative electrode inner uncoated region 12c continues in the width direction of the negative electrode 12 from the front end of the negative electrode 12 and is connected with the negative electrode side end uncoated region 12b. The negative electrode inner uncoated region 12c is configured without the negative active material layer 123, so one side of the negative electrode current collector 122 is exposed at the negative electrode inner uncoated region 12c. For example, respective corners of the negative electrode current collector 122 and one negative active material layer 123 may be aligned with each other, so the negative electrode inner uncoated region 12c and the negative electrode side end uncoated region 12b may be arranged along an outer boundary of the negative active material layer 123 in an L-shape.

Similarly, the negative electrode outer uncoated region 12d continues in the width direction of the negative electrode 12 from the rear end of the negative electrode 12 and is connected with the negative electrode side end uncoated region 12b. The negative electrode outer uncoated region 12d is configured without the negative active material layer 123 formed on one side of the negative electrode current collector 122, and thus one side of the negative electrode current collector 122 is exposed at the negative electrode outer uncoated region 12d. For example, respective corners of the negative electrode current collector 122 and another negative active material layer 123 may be aligned with each other, so the negative electrode outer uncoated region 12c and the negative electrode side end uncoated region 12b may be arranged along an outer boundary of the negative active material layer 123 in an L-shape. It is noted that while the two negative electrode side end uncoated regions 12b on opposite surfaces of the negative electrode current collector 122 may overlap each other, the negative electrode inner and outer uncoated regions 12c and 12d may be on opposite surfaces of the negative electrode current collector 122 and on opposite ends of the negative electrode current collector 122. In other words, the negative electrode inner and outer uncoated regions 12c and 12d may be horizontally spaced apart from each other, i.e., along a length of the negative electrode current collector 122, so the negative electrode inner and outer uncoated regions 12c and 12d may not overlap each other.

Further, as illustrated in FIG. 4, the positive electrode 11 and the negative electrode 12 are spirally wound after disposing the separator 13, i.e., an insulator, therebetween, and then pressed flat. As further illustrated in FIG. 4, the negative electrode inner uncoated region 12c is disposed at the center of the electrode assembly 10, e.g., to face the open space in the center of the electrode assembly 10.

In detail, as illustrated in FIG. 3, the negative active material layer 123 is arranged on the opposite side of the negative electrode inner uncoated region 12c, so the negative active material layer 123 comes in contact with the separator 13, i.e., the negative active material layer 123 on a first surface of the negative electrode current collector 122 separates between the separator 13 and the negative electrode inner uncoated region 12c on a second surface of the negative electrode current collector 122. Then, the negative and positive electrodes 11 and 12 with the separators 13 are stacked and are spirally wound together, so the winding direction is such that the negative electrode inner uncoated region 12c is folded to have one portion thereof directly face another portion thereof, as illustrated in FIG. 4.

That is, in the present exemplary embodiment, the negative electrode inner uncoated region 12c is formed on only one inner side of the negative electrode 12 and the negative active material layer 123 is coated on the other side. The negative active material layer 123 formed on the opposite side (inner side) of the negative electrode inner uncoated region 12c faces the positive active material layer 113 with the separator 13 therebetween and is associated with charging and discharging.

On the other hand, the negative electrode outer uncoated region 12d is disposed at the outermost side of the electrode assembly 10 and exposed to the outside of the electrode assembly 10. The portion where the negative electrode outer uncoated region 12d is formed, i.e., a portion formed to be longer than the positive electrode 11, protrudes further than the positive electrode 11 and surrounds the positive electrode 11.

The negative active material layer 123 is formed on the opposite side of the negative electrode outer uncoated region 12d, so the negative active material layer 123 comes in contact with the separator 13. In the present exemplary embodiment, the negative electrode outer uncoated region 12d is formed on only one outer side of the negative electrode 12 and the negative active material layer 123 is coated on the other side. The negative active material layer 123 formed on the opposite side (inner side) of the negative electrode outer uncoated region 12d faces the positive active material layer 113 with the separator 13 therebetween and is associated with charging and discharging.

As described above, according to the present exemplary embodiment, since the negative electrode inner uncoated region 12c is formed where the negative electrodes 12 face each other at the innermost side of the electrode assembly 10, it is possible to reduce the volume and the weight of the electrode assembly 10 by removing unnecessary active material layer that is not associated with charging and discharging. Further, since the negative electrode outer uncoated region 12d is formed at a portion that does not face the positive electrode 11 at the outermost side of the electrode assembly 10, it is possible to reduce the volume and the weight of the electrode assembly 10. Therefore, the energy density of the electrode assembly 10 and the rechargeable battery 101 is improved.

Figure 5:
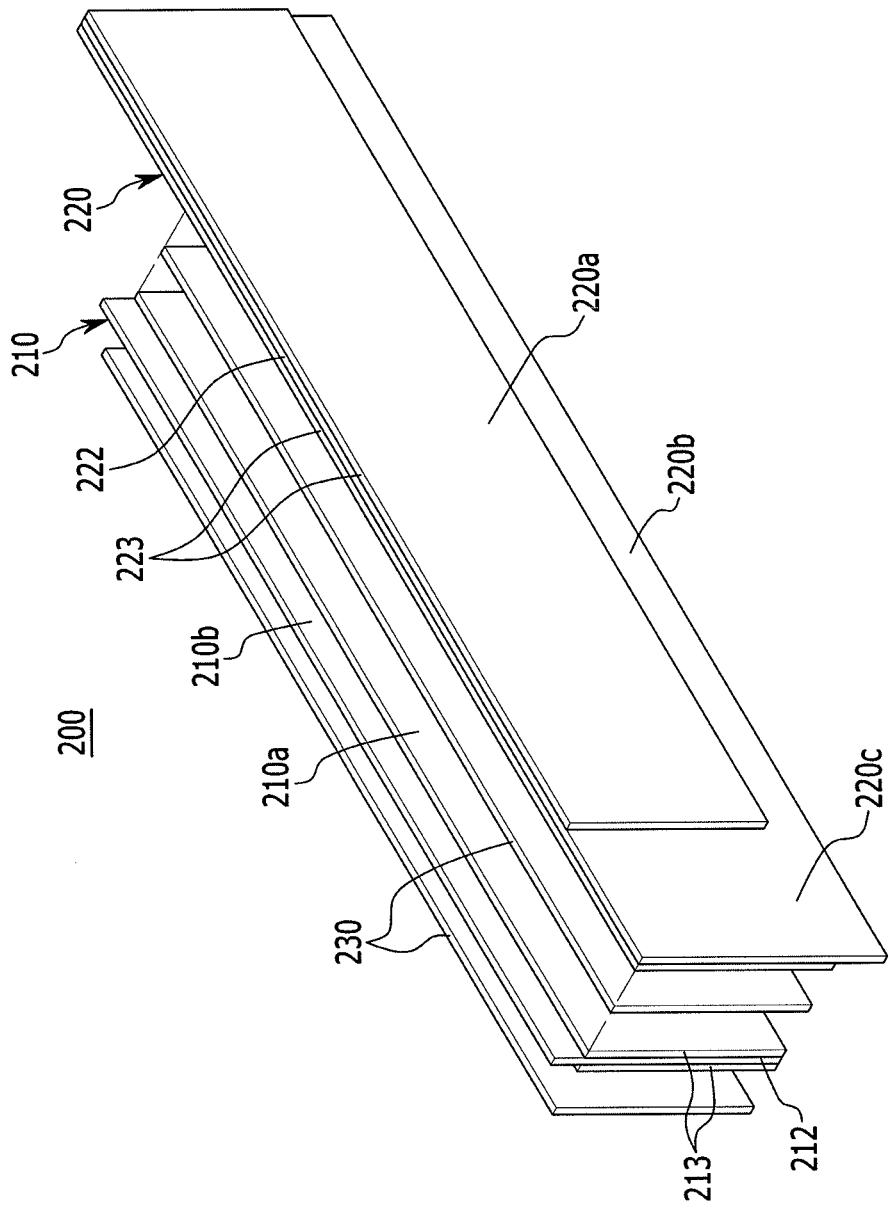
FIG. 5 illustrates an exploded perspective view showing an electrode assembly according to a second exemplary embodiment.
Figure 6:
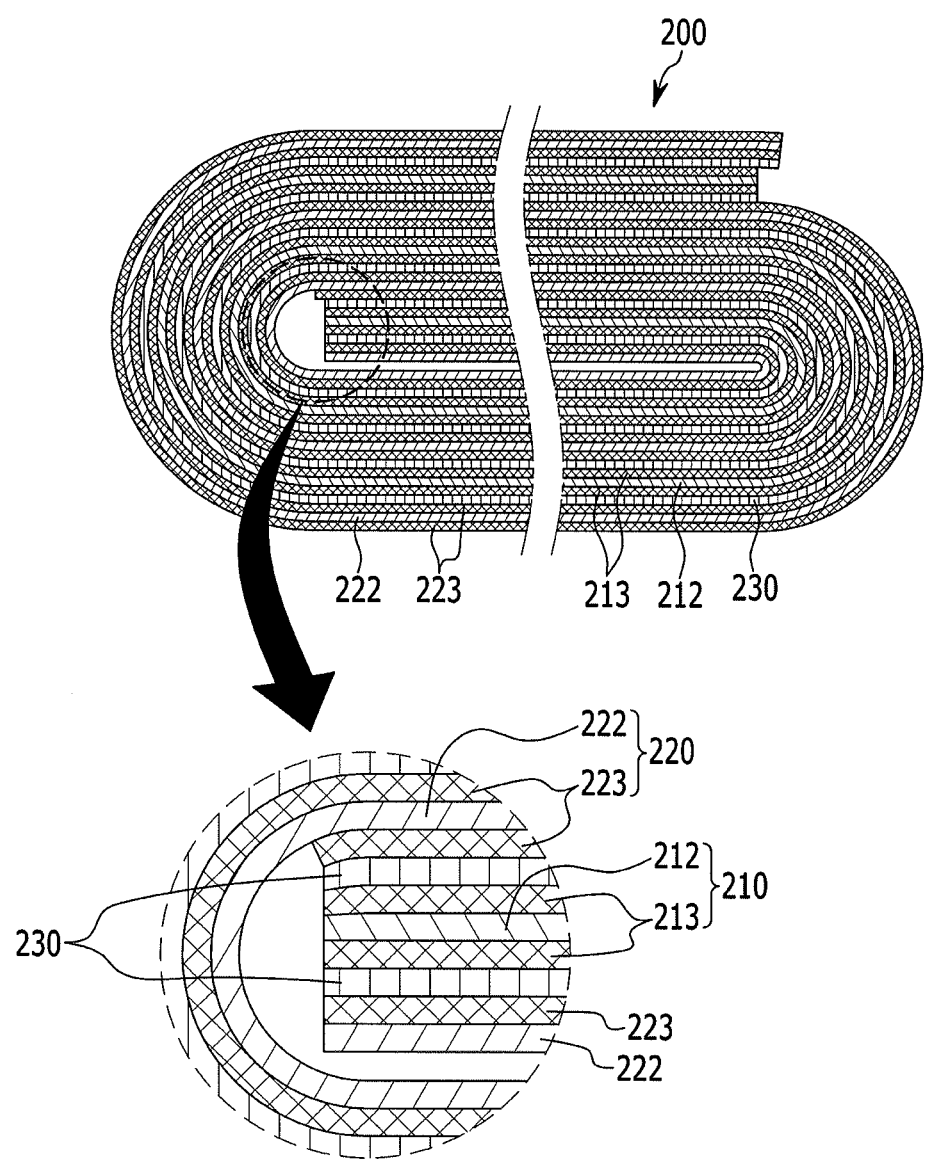
FIG. 6 illustrates a cross-sectional view of the electrode assembly in FIG. 5 in a coupled and wound state.

FIG. 5 is an exploded perspective view showing an electrode assembly according to a second exemplary embodiment. FIG. 6 is a cross-sectional view of the electrode assembly in FIG. 5 in a coupled and wound state.

Referring to FIGS. 5 and 6, an electrode assembly 200 according to the present exemplary embodiment includes a positive electrode 210, a negative electrode 220, and a separator 230 disposed between the positive electrode 210 and the negative electrode 220. The positive electrode 210 and the negative electrode 220 are spirally wound with the separator 230 therebetween, and then pressed flat.

The rechargeable battery according to the present exemplary embodiment has the same structure as that of the rechargeable battery according to the first exemplary embodiment, except for the structure of the electrode assembly 200, so the description of the same structure is not repeated.

The positive electrode 210 is structured by forming a positive active material layer 213 on both sides of a positive electrode current collector 212 formed of a thin plate metal foil. The positive electrode 210 includes a positive electrode coating portion 210a that is a region coated with an active material and a positive electrode side end uncoated region 210b that is a region without an active material coated. The positive electrode side end uncoated region 210b is formed to continue along one side end of the positive electrode 210 in the longitudinal direction of the positive electrode 210.

In the negative electrode 220, a negative active material layer 223 is attached to both sides of a negative electrode current collector 222 formed of a thin plate metal foil, and the negative electrode current collector 222 is formed in a stripe shape that is long in one direction. Further, the negative electrode 220 includes a negative electrode coating portion 220a that is a region coated with an active material and a negative electrode side end uncoated region 220b that is a region without an active material coated. The negative electrode side end uncoated region 220b is formed to continue along one side end of the negative electrode 220 in the longitudinal direction of the negative electrode 220, e.g., the negative electrode coating portion 220a and the negative electrode side end uncoated region 220b are positioned parallel to each other.

Further, the negative electrode 220 includes a negative electrode inner uncoated region 220c formed at the front end of the negative electrode 220, and the negative electrode inner uncoated region 220c is positioned at the innermost side of the electrode assembly 200. The negative electrode inner uncoated region 220c continues in the width direction of the negative electrode 220 from the front end of the negative electrode 220 and is connected with the negative electrode side end uncoated region. The negative electrode inner uncoated region 220c is configured without the negative active material layer 223 formed on one side of the negative electrode current collector 222, so the negative electrode current collector 222 is exposed at the negative electrode inner uncoated region 220c. It is noted that while the negative electrode 220 includes the negative electrode inner uncoated region 220c, i.e., as the negative electrode inner uncoated region 120c of the first exemplary embodiment, the negative electrode 220 does not include a portion equivalent to the negative electrode outer uncoated region 120d of the first exemplary embodiment.

The negative electrode inner uncoated region 220c is disposed at the center of the electrode assembly 200 and the negative electrode inner uncoated region 220c is folded to face each other, in the spiral wounding. The negative active material layer 223 is formed on the opposite side of the negative electrode inner uncoated region 220c, so the negative active material layer 223 comes in contact with the separator 230. The negative active material layer 223 formed on the opposite side of the negative electrode inner uncoated region 220c faces the positive active material layer 213 with the separator 230 therebetween and is associated with charging and discharging.

Figure 7:
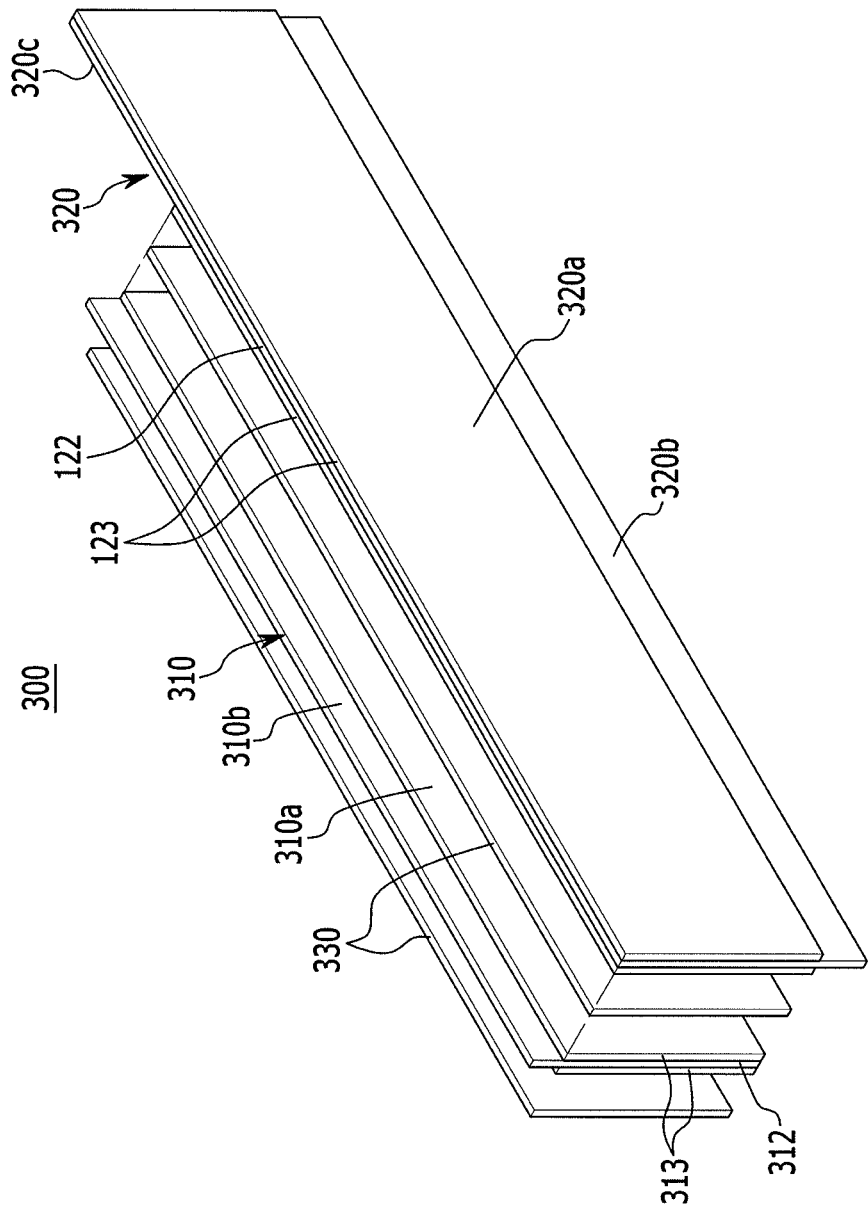
FIG. 7 illustrates an exploded perspective view showing an electrode assembly according to a third exemplary embodiment.
Figure 8:
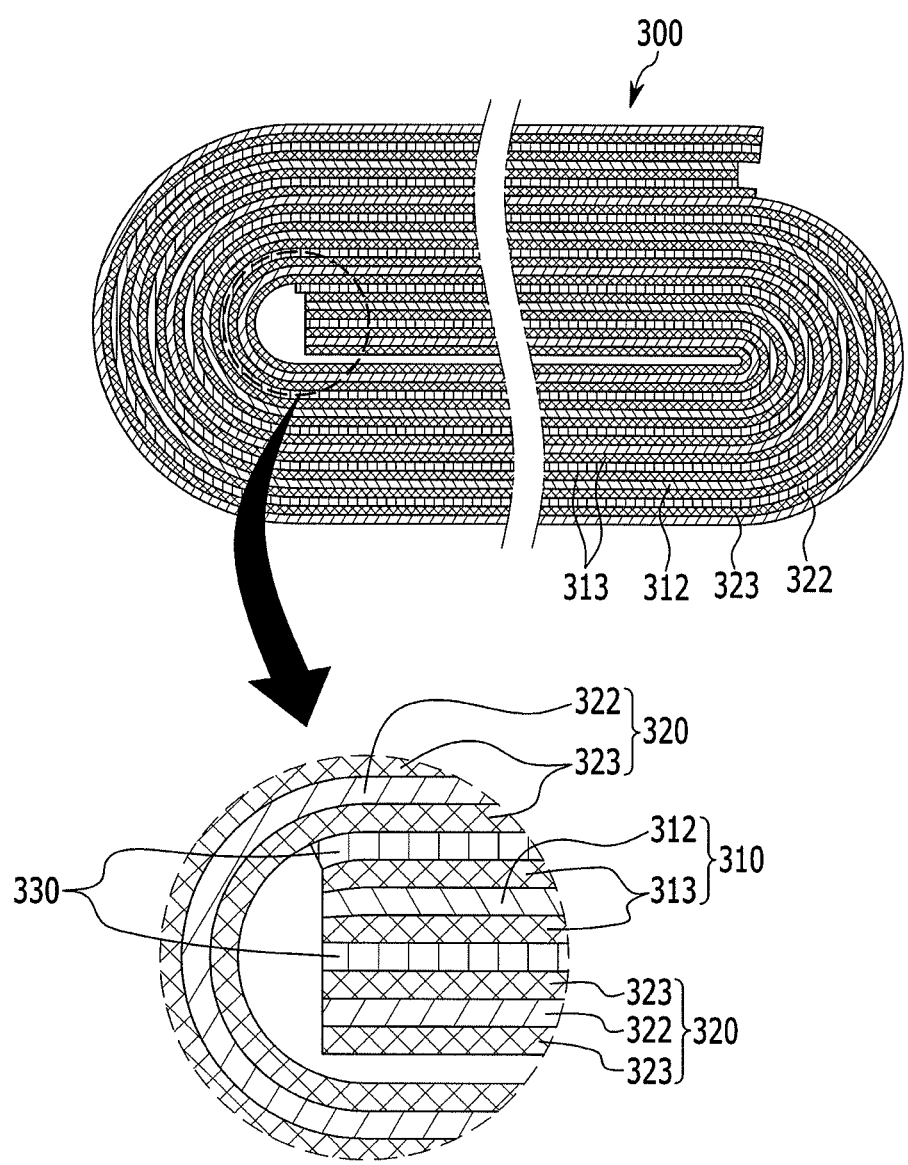
FIG. 8 illustrates a cross-sectional view of the electrode assembly in FIG. 7 in a coupled and wound state.

FIG. 7 is an exploded perspective view showing an electrode assembly according to a third exemplary embodiment. FIG. 8 is a cross-sectional view of the electrode assembly in FIG. 7 in a coupled and wound state.

Referring to FIGS. 7 and 8, an electrode assembly 300 according to the present exemplary embodiment includes a positive electrode 310, a negative electrode 320, and a separator 330 disposed between the positive electrode 310 and the negative electrode 320. The positive electrode 310 and the negative electrode 320 are spirally wound with the separator 330 therebetween, and then pressed flat. The rechargeable battery according to the present exemplary embodiment has the same structure as that of the rechargeable battery according to the first exemplary embodiment, except for the structure of the electrode assembly 300, so the description of the same structure is not repeated.

In the positive electrode 310, a positive active material layer 313 is attached to both sides of a positive electrode current collector 312 formed of a thin plate metal foil, and the positive electrode current collector 312 is formed in a stripe shape that is long in one direction. Further, the positive electrode 310 includes a positive electrode coating portion 310a that is a region coated with the positive active material layer 313, and a positive electrode side uncoated region 310b that is a region without the positive active material layer 313 coated. The positive electrode side end uncoated region 310b is formed to continue along one side end of the positive electrode 310 in the longitudinal direction of the positive electrode 310.

In the negative electrode 320, a negative active material layer 323 is formed on both sides of a negative electrode current collector 322 formed of a thin plate metal foil, and the negative electrode current collector 322 is formed in a stripe shape that is long in one direction. The separator 330 is made of a porous material, insulates the positive electrode 310 from the negative electrode 320, and provides a passage through which ions move.

Further, the negative electrode 320 includes a negative electrode coating portion 320a that is a region coated with a negative active material layer 323, and a negative electrode side end uncoated region 320b that is a region without the negative active material layer 323 coated. The negative electrode side end uncoated region 320b is formed to continue along one side end of the negative electrode 320 in the longitudinal direction of the negative electrode 320.

Further, the negative electrode 320 further includes a negative electrode outer uncoated region 320c formed at the rear end of the negative electrode 320, and the negative electrode outer uncoated region 320c is positioned at the outermost side of the electrode assembly 300. The negative electrode outer uncoated region 320c continues in the width direction of the negative electrode 320 from the rear end of the negative electrode 320 and is connected with the negative electrode side end uncoated region 320b. The negative electrode outer uncoated region 320c is configured without the negative active material layer 323 formed on one side of the negative electrode current collector 322, and thus the negative electrode current collector 322 is exposed at the negative electrode outer uncoated region 320c.

The negative electrode outer uncoated region 320c is disposed at the outermost side of the electrode assembly 300 and exposed to the outside of the electrode assembly 300, when wound. The portion where the negative electrode outer uncoated region 320c is formed, a portion formed to be longer than the positive electrode 310, protrudes further than the positive electrode 310 and surrounds the outer portion of the positive electrode 310. It is noted that while the negative electrode 320 includes the negative electrode outer uncoated region 320c, i.e., as the negative electrode outer uncoated region 120d of the first exemplary embodiment, the negative electrode 320 does not include a portion equivalent to the negative electrode inner uncoated region 120c of the first exemplary embodiment.

The negative active material layer 323 is formed on the opposite side of the negative electrode outer uncoated region 320c, so the negative active material layer 323 comes in contact with the separator 330. The negative active material layer 323 formed on the opposite side of the negative electrode outer uncoated region 320c faces the positive active material layer 313 with the separator 330 therebetween and is associated with charging and discharging.

Figure 9:
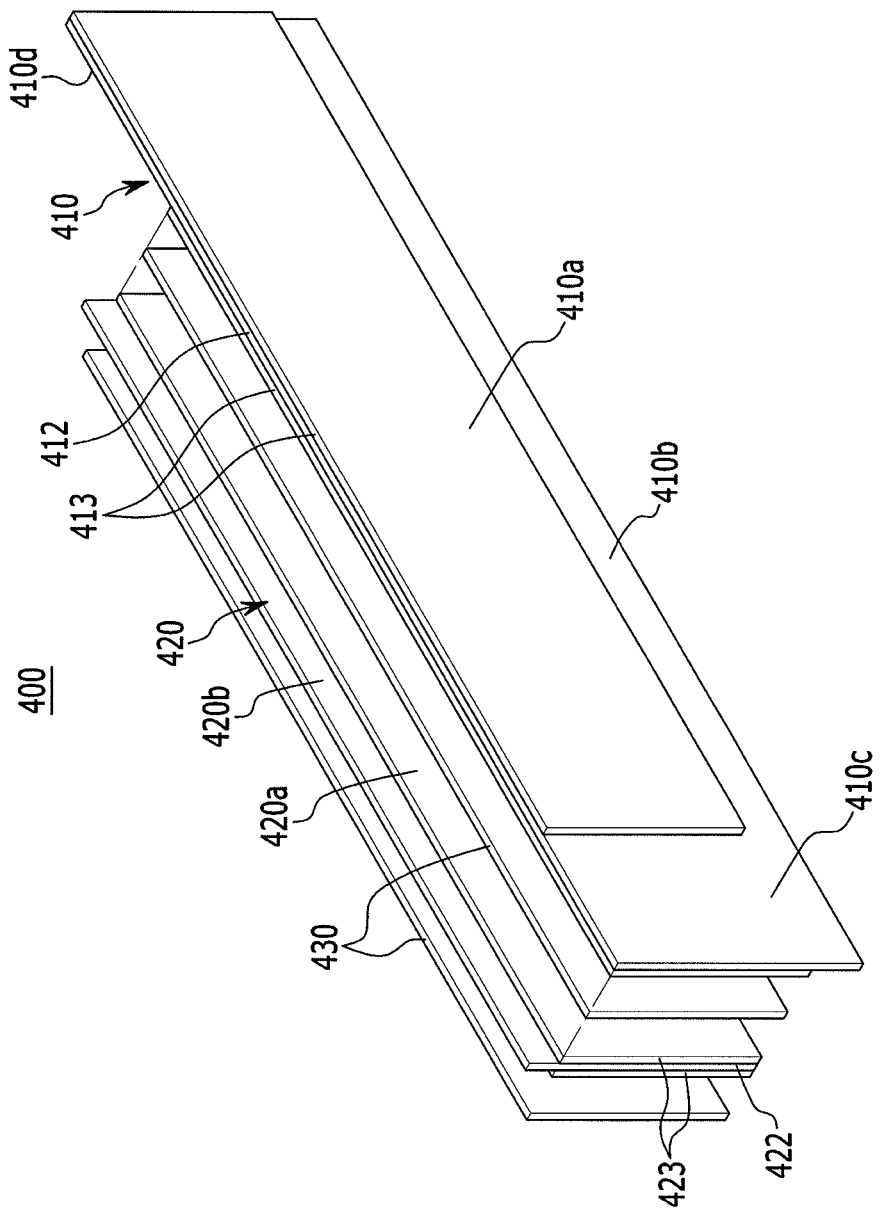
FIG. 9 illustrates an exploded perspective view showing an electrode assembly according to a fourth exemplary embodiment.
Figure 10:
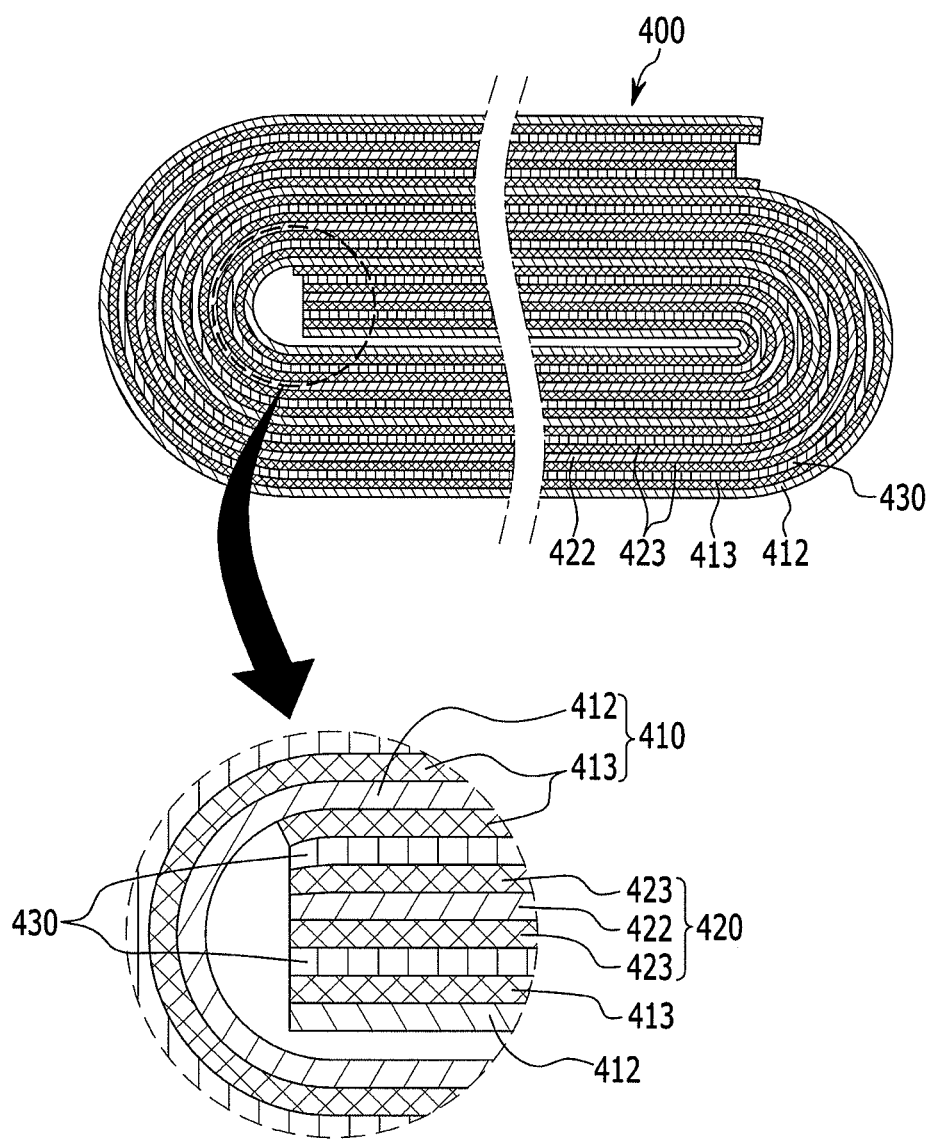
FIG. 10 illustrates a cross-sectional view of the electrode assembly in FIG. 9 in a coupled and wound state.

FIG. 9 is an exploded perspective view showing an electrode assembly according to a fourth exemplary embodiment. FIG. 10 is a cross-sectional view of the electrode assembly in FIG. 9 in a coupled and wound state.

An electrode assembly 400 according to the present exemplary embodiment includes a positive electrode 410, a negative electrode 420, and a separator 430 disposed between the positive electrode 410 and the negative electrode 420. The positive electrode 410 and the negative electrode 420 are spirally wound with the separator 430 therebetween, and then pressed flat. The rechargeable battery according to the present exemplary embodiment has the same structure as that of the rechargeable battery according to the first exemplary embodiment, except for the structure of the electrode assembly 400, so the description of the same structure is not repeated.

In the positive electrode 410, a positive active material layer 413 is attached to both sides of a positive electrode current collector 412 formed of a thin plate metal foil and the positive electrode current collector 412 is formed in a stripe shape that is long in one direction. Further, the positive electrode 410 includes a positive electrode coating portion 410a that is a region coated with the positive active material layer 413, and a positive electrode side end uncoated region 410b that is a region without the positive active material layer 413 coated. The positive electrode side end uncoated region 410b is formed to continue along one side end of the positive electrode 410 in the longitudinal direction of the positive electrode 410.

In the negative electrode 420, a negative active material layer 423 is formed on both sides of a negative electrode current collector 422 formed of a thin plate metal foil and the negative electrode current collector 422 is formed in a stripe shape that is long in one direction. The separator 430 is made of a porous material, insulates the positive electrode 410 from the negative electrode 420, and provides a passage through which ions move.

Further, the negative electrode 420 includes a negative electrode coating portion 420a that is a region coated with a negative active material layer 423, and a negative electrode side end uncoated region 420b that is a region without the negative active material layer 423 coated. The negative electrode side end uncoated region 420b is formed to continue along one side end of the negative electrode 420 in the longitudinal direction of the negative electrode 420. The positive electrode 410 further includes a positive electrode inner uncoated region 410c formed at the front end of the positive electrode 410 and a positive electrode outer uncoated region 410d formed at the rear end of the positive electrode 410. The positive electrode inner uncoated region 410c is positioned at the innermost side of the electrode assembly 400, and the positive electrode outer uncoated region 410d is positioned at the outermost side of the electrode assembly 400.

Further, the positive electrode inner uncoated region 410c continues in the width direction of the positive electrode 410 from the front end of the positive electrode 410 and is connected with the positive electrode side end uncoated region 410b. The positive electrode inner uncoated region 410c is configured without the positive active material layer 413 formed on one side of the positive current collector 412, and thus one side of the positive current collector 412 is exposed at the positive electrode inner uncoated region 410c.

The positive electrode outer uncoated region 410d continues in the width direction of the positive electrode 410 from the rear end of the positive electrode 410 and is connected with the positive electrode side end uncoated region 410b. The positive outer uncoated region 410d is configured without the positive active material layer 413 formed on one side of the positive current collector 412, and thus one side of the positive current collector 412 is exposed at the positive electrode outer uncoated region 410d.

The positive electrode 410 and the negative electrode 420 are spirally wound after disposing the separator 430, which is an insulator, therebetween, and then pressed flat. The positive electrode inner uncoated region 410c is disposed at the center of the electrode assembly 400 and the positive electrode inner uncoated region 410c is folded to face each other, in the spiral wounding. A positive active material layer 413 is formed on the opposite side of the positive electrode inner uncoated region 410c and comes in contact with the separator 430, and the positive active material layer 413 faces the negative active material layer 423 with the separator 430 therebetween and is associated with charging and discharging.

On the other hand, the positive electrode outer uncoated region 410d is disposed at the outermost side of the electrode assembly 400 and exposed to the outside of the electrode assembly 400. The portion where the positive electrode outer uncoated region 410d is formed, a portion formed to be longer than the negative electrode 420, protrudes further than the negative electrode 420 and surrounds the outer portion of the negative electrode 420. The positive active material layer 413 is formed on the opposite side of the positive electrode outer uncoated region 410d, so the positive active material layer 413 comes in contact with the separator 430. The positive active material layer 413 formed on the opposite side (inner side) of the positive electrode outer uncoated region 410d faces the negative active material layer 423 with the separator 430 therebetween and is associated with charging and discharging.

As described above, according to the present exemplary embodiment, since the positive electrode inner uncoated region 410c is formed where the positive electrodes 410 face each other at the innermost side of the electrode assembly 400, it is possible to reduce the volume and the weight of the electrode assembly 400 by removing unnecessary active material layer that is not associated with charging and discharging. Further, since the positive electrode outer uncoated region 410d is formed at a portion that does not face the negative electrode 420 at the outermost side of the electrode assembly 400, it is possible to reduce the volume and the weight of the electrode assembly 400.

According to the exemplary embodiments, it is possible to improve energy density and prevent unnecessary waste of a raw material by forming an uncoated region at a portion that is not associated with charging and discharging. In contrast, conventional positive and negative electrodes have an active material layer that is not associated with charging and discharging because of the structural features of the conventional electrode assembly. Therefore, the active material layers in the conventional electrode assembly unnecessarily increase the weight and volume of the electrode assembly.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

<Description of symbols>

101: Rechargeable battery
11, 210, 310, 410: Positive electrode
12, 220, 320, 420: Negative electrode    13, 230, 330, 430: Separator
11a, 210a, 310a, 410a: Positive electrode coating portion
11b, 210b, 310b, 410b: Positive electrode side end uncoated region
12a, 220a, 320a, 420a: Negative electrode coating portion <Description of symbols>

12b, 220b, 320b, 420b: Negative electrode side end uncoated region
12c, 220c: Negative electrode inner uncoated region
12d, 320c: Negative electrode outer uncoated region
21: Positive terminal                        22: Negative terminal
25, 26: Terminal connecting member           28: Case
30: Cap assembly                             31: Cap plate
32: Electrolyte injection opening            34: Vent hole
38: Sealing cap                              39: Vent member
39a: Notch                                   41: Current collecting tap
42: Current collecting tap                   43, 45: Lower insulating member
52, 62: Upper insulating member              55, 65: Gasket
112, 212, 312, 412: Positive electrode current collector
113, 213, 313, 413: Positive active material layer
122, 222, 322, 422: Negative electrode current collector
123, 223, 323, 423: Negative active material layer
410c: Positive electrode inner uncoated region
410d: Positive electrode outer uncoated region

What is claimed is:

1. An electrode assembly, comprising:
a positive electrode including a positive active material layer on each of first and second surfaces of a positive electrode current collector;
a negative electrode including a negative active material layer on each of first and second surfaces of a negative electrode current collector; and
an inner separator between the positive electrode and the negative electrode,
wherein each of the positive electrode and the negative electrode includes a side end uncoated region at respective side ends of the positive electrode and the negative electrode, the side end uncoated regions of each of the positive and negative electrodes including no active material layers on respective electrode current collectors,
wherein at least one of the positive electrode and the negative electrode has:
an inner uncoated region on a front end and the first surface of the current collector and positioned at a center of the electrode assembly, the inner uncoated region including no active material layer thereon, and
an outer uncoated region without an active material layer thereon, the outer uncoated region being on a rear end and the second surface of the current collector, and the outer uncoated region being at the outermost side of the electrode assembly.

2. The electrode assembly as claimed in claim 1, wherein the inner uncoated region is folded to face a portion thereof.

3. The electrode assembly as claimed in claim 2, wherein an active material layer and the inner uncoated region are on opposite surfaces of the current collector, the active material layer being in contact with the separator.

4. The electrode assembly as claimed in claim 3, wherein the electrode assembly is spirally wound with the separator between the positive electrode and the negative electrode, the inner uncoated region and the side end uncoated region of any one of the positive electrode and the negative electrode are connected with each other.

5. The electrode assembly as claimed in claim 1, wherein an active material layer and the outer uncoated region are on opposite surfaces of the current collector, the active material layer being in contact with the separator.

6. The electrode assembly as claimed in claim 5, wherein the outer uncoated region is connected with the side end uncoated region.

7. The electrode assembly as claimed in claim 1, wherein the inner uncoated region is on the negative electrode.

8. The electrode assembly as claimed in claim 1, wherein the inner uncoated region is in the positive electrode.

9. A rechargeable battery, comprising:
- an electrode assembly configured to perform charging and discharging;
- a case accommodating the electrode assembly; and
- a terminal electrically connected with the electrode assembly and protruding outside the case, the electrode assembly including:
  - a positive electrode including a positive active material layer on each of first and second surfaces of a positive electrode current collector,
  - a negative electrode including a negative active material layer on each of first and second surfaces of a negative electrode current collector, and
  - an inner separator between the positive electrode and the negative electrode,
- wherein each of the positive electrode and the negative electrode includes a side end uncoated region at respective side ends of the positive electrode and the negative electrode, the side end uncoated regions of each of the positive and negative electrodes including no active material layers on respective electrode current collectors,
- wherein at least one of the positive electrode and the negative electrode has:
  - an inner uncoated region on a front end and the first surface of the current collector and positioned at a center of the electrode assembly, the inner uncoated region including no active material layer thereon, and
  - an outer uncoated region without an active material layer thereon, the outer uncoated region being on a rear end and the second surface of the current collector, and the outer uncoated region being at the outermost side of the electrode assembly.

10. The rechargeable battery as claimed in claim 9, wherein the inner uncoated region is folded to face a portion thereof.

11. The rechargeable battery as claimed in claim 10, wherein an active material layer and the inner uncoated region are on opposite surfaces of the current collector, the active material layer being in contact with the separator.

12. The rechargeable battery as claimed in claim 11, wherein the electrode assembly is spirally wound with the separator between the positive electrode and the negative electrode, the inner uncoated region and the side end uncoated region of any one of the positive electrode and the negative electrode are connected with each other.

13. The rechargeable battery as claimed in claim 9, wherein an active material layer and the outer uncoated region are on opposite surfaces of the current collector, the active material layer being in contact with the separator.

14. The rechargeable battery as claimed in claim 13, wherein the outer uncoated region is connected with the side end uncoated region.

15. The rechargeable battery as claimed in claim 9, wherein the inner uncoated region is on the negative electrode.

16. The rechargeable battery as claimed in any one of claim 9, wherein the inner uncoated region is in the positive electrode.

* * * * *